United States Patent [19]

Svab

[11] Patent Number: 4,949,588
[45] Date of Patent: Aug. 21, 1990

[54] CONTROLLABLE FRICTION GEAR

[75] Inventor: Eugen Svab, Cologne, Fed. Rep. of Germany

[73] Assignee: Ford Motor Company, Dearborn, Mich.

[21] Appl. No.: 370,655

[22] Filed: Jun. 23, 1989

[30] Foreign Application Priority Data

Jul. 19, 1988 [DE] Fed. Rep. of Germany ....... 3824399

[51] Int. Cl.$^5$ .................... F16H 15/42; F04C 15/04
[52] U.S. Cl. .......................................... 74/199; 74/200
[58] Field of Search ........................ 74/200, 199, 211

[56] References Cited

U.S. PATENT DOCUMENTS 2,336,799 12/1943 Palm ....................................... 74/199
3,486,390 12/1969 Lee et al. ............................... 74/200

FOREIGN PATENT DOCUMENTS 0102938 6/1983 European Pat. Off. .
812628 9/1951 Fed. Rep. of Germany .
1167616 4/1964 Fed. Rep. of Germany ........ 74/200
2126122 12/1975 Fed. Rep. of Germany .

Primary Examiner—Leslie A. Braun
Assistant Examiner—Scott Anchell
Attorney, Agent, or Firm—Frank G. McKenzie; Donald J. Harrington

[57] ABSTRACT

An annular friction gear includes a driving shaft, a driving disc connected to the driving shaft, a driven shaft, a driven disc connected to the driven shaft, the shafts discs being coaxially mounted rotatably. An annular friction element, radially displaceable mechanically or hydraulically, between the discs rests in frictional contact at one contact point on the driving disc and at a diametrically opposite contact point on the driven disc. The friction element is in the form of a ball bearing disposed obliquely with respect to the shaft axis so that its outer race rests at one contact point on the driving disc and at the contact point on the driven disc. The displacement device engages on the inner race of the ball bearing.

7 Claims, 2 Drawing Sheets

CONTROLLABLE FRICTION GEAR

BACKGROUND OF THE INVENTION

1. Field of the Invention

This invention relates to the field of variable friction ring gearing.

2. Background of the Invention

German Patent No. 21 26 122 describes an annular friction gear comprising an outer conical disc connected to a driving shaft and an outer conical disc connected to a driven shaft, the axes of the discs being mutually offset. Power is transmitted between the discs by a ball bearing. The inner race of the bearing is in the form of a friction element having two inner conical chamfers contacting outer conical discs. One side of the inner race rests on one disc, the other size of the inner race rests on the other conical disc. When the ball bearing is displaced radially along the line connecting the inner conical chamfers of the inner race, one running diameter on one disc is displaced toward the center and the other running diameter on the other disc is displaced by the same amount away from the center.

An annular friction gear of this type requires an offset between the driving shaft and driven shaft. Also, the form of the conical discs and the shape of the inner race of the bearing cause its individual parts to be relatively complicated and expensive to manufacture.

German Patent No. 812,618 describes an annular friction gear in which driving and driven shafts and associated flat discs are arranged coaxially. To transmit power, a radially displaceable friction element comprising two friction rings is located between the driving disc and driven disc. Each friction ring has a conical friction surface and a hollow shaft formed integrally at the center of the side remote from the friction surface. A helical spring, located within hollow shafts surrounded by a sleeve, presses friction rings away from each other and against the flat surfaces of the driving disc and driven disc.

In the arrangement of this type, relatively large axial dimensions are required because of the design of the friction element in the axial direction. In addition, the friction element is constructed in a complicated manner and cannot be produced economically.

SUMMARY OF THE INVENTION

An object of the present invention is to provide an improved controllable annular friction gear that is compact and easy to produce.

This object is realized in an annular friction gear having a driving shaft, a driven disc connected to the driving shaft, a driven shaft and a driven disc connected to the driven shaft, the mutually facing flat surfaces of the discs opposing one another and located in the housing. The shafts are coaxial and have an annular friction element radially displaceable between the discs by a displacement device which rests in frictional contact at a first abutment point located on the driving disc and at a second abutment point located on the driven disc. As the friction element is displaced, the first abutment point moves toward the center of the driven disc and the other abutment point moves away from the center of the driven disc. A ball bearing is arranged obliquely with respect to the surfaces of the discs and is located between the discs so that its outer race rests on the first and second abutment points. The displacement device engages the inner race of the ball bearing.

An advantage in the annular friction gear according to this invention is its compact size both radially and axially resulting because the axes of the shafts are not offset and the axial distance between the driving disc and driven disc is small. The friction element is a ball bearing.

The friction gear according to this invention is produced economically because the surfaces of the discs are flat and because the friction element is a simple, standard ball bearing, radially displaceable by a displacement device constructed in a simple manner.

It is particularly advantageous to use the friction gear of this invention as a controllable added gear of a gear pump or sickle pump, by means of which pressurized fluid is provided in an automatic transmission. This requires that the quantity of pressurized fluid supplied at low rotational speed, e.g., at engine idle speed, is relatively large, approximately 30 liters per minute, and the quantity of pressurized fluid supplied at high rotational speed is relatively low, approximately 15 liters per minute. Without benefit of the controllable added gear of this invention, such a pump would have to be made sufficiently strong to be able to supply the required large quantity at low rotational speed.

By the addition of the annular friction gear according to this invention, a pump can be designed for a high rotational speed at which the volumetric flow rate is smaller, and the greater volume required at the lower rotational speed is achieved. The annular friction gear is controlled so that on the take-off side it drives the pump at a higher rotational speed.

BRIEF DESCRIPTION OF THE DRAWINGS

The invention is explained in greater detail with reference to the embodiments in the figures in which.

DESCRIPTION OF THE PREFERRED EMBODIMENT

Figure 1:
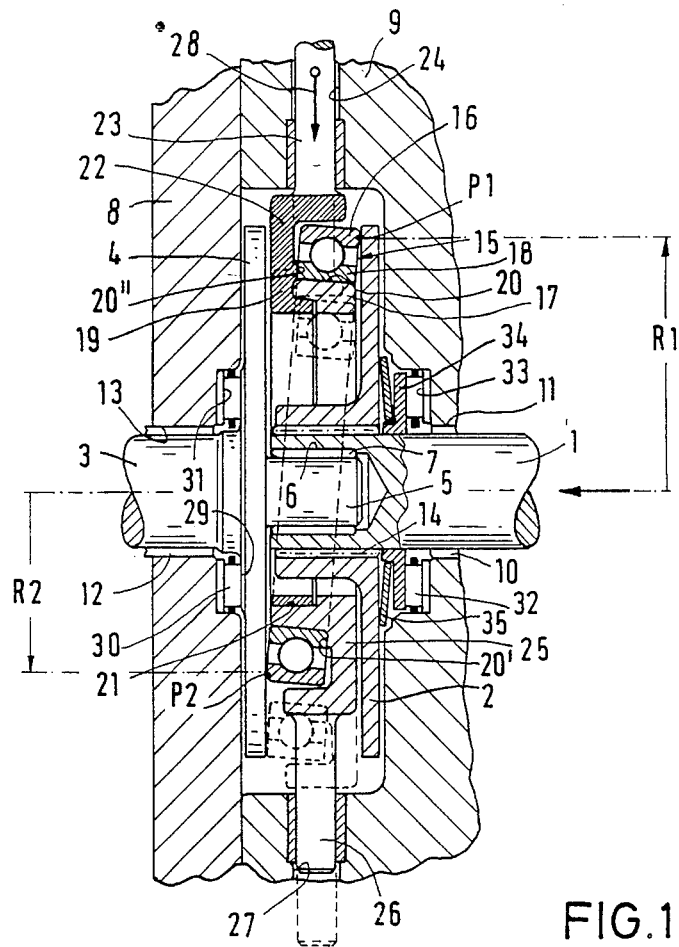
FIG. 1 is a cross section through a mechanically displaceable annular friction gear according to this invention.

In the embodiment illustrated in FIG. 1, the continually variable annular friction gear comprises a driving disc 2 connected to a driving shaft 1, and a driven disc 4 connected to a driven shaft 3. The shafts are arranged coaxially with the flat friction surfaces of the discs spaced axially. A pin 5 projecting centrally beyond disc 4 extends into bore 6, formed in driven shaft 1. A bearing 7, in the form of a needle bearing or a bearing shell, is provided between the outer surface of pin 5 and the inner surface of bore 6.

The housing of the gear comprises a cup-shaped housing part 9 to which a plate-shaped housing part 8 is secured. The discs are located in the space enclosed by the housing parts. Housing part 9 can be a part of a transmission or engine housing; housing part 8 is a component of a fluid pump.

Shaft 1 is mounted in one bearing 10 located in a bore 11 of the housing part 9. Similarly, shaft 3 is mounted by bearing 12 located in bore 13 of housing part 8.

Driving shaft 1 is connected rotatably rigidly to driving disc 2 by serrations 14 formed on the outer periphery of shaft 1. A portion of the shaft in which the serrations are formed extends into disc 2.

A standard ball bearing 15, arranged obliquely in the space between the discs, has one side of its outer race 16 resting on the driving disc at a first abutment or contact point P1 and the other side of the outer race resting on the driven disc at a second abutment or contact point P2. As ball bearing 15 is displaced radially, point P1 approaches the axes of the shafts by the same amount as point P2 moves away from the axis. At another annular position from that shown in FIG. 1, as bearing 15 is displaced radially, point P1 moves away from the axes of the shafts by the same amount that point P2 approaches the axes.

The displacement device for moving ball bearing 15 includes a first holding ring 17, whose outer surface receives the inner periphery of inner race 18 of the ball bearing and a second holding ring 19. The outer surface 20 of holding ring 17 is inclined to correspond to the oblique arrangement of ball bearing 15. Holding ring 17 is provided on its inner periphery with an annular depression 21, into which holding ring 19 is located. In accordance with the oblique disposition of ball bearing 15, holding ring 17 is dimensioned in the axial direction such that its outer surface supports the entire inner periphery of inner race 18.

A web 22, which extends radially outward through a gap between bearing 15 and driving disc 4, is connected to an actuating rod 23, which extends radially outward through a bore 24 in housing 9. Web 22 is secured by holding ring 19 to the side of bearing 15 axially opposite abutment point P1, the point of contact between outer race 16 and driving disc 2. In a corresponding matter, holding ring 17, on the side of the bearing axially opposite abutment point P2, is connected by a web 25 extending radially through a gap between bearing 15 and driving disc 2 to a guide rod 26, which is guided in a radial bore 27 of housing part 9. Bores 24 and 27, actuating rod 23 and guide rod 26 are directed toward one another and perpendicular to the common axis of the shafts. By displacing actuating rod 23 in the direction of arrow 28, bearing 15 is moved radially in the manner described in order to set the transmission ratio. In FIG. 1, the extremities of movement are indicated by continuous and broken lines; the respective transmission ratios are determined by the radii R1 and R2.

Adjoining the outer surface 20 of holding ring 17, web 25 comprises an axial abutment surface 20' contacting inner race 18 of the bearing, the abutment surface extending at right angles to the outer surface 20. A corresponding axial abutment surface 20" is also formed on the web 22 of holding ring 19.

On the side of driving disc 4 facing the plate-shaped housing part 8, a running surface 29 is provided for bearing 30, which is supported also on running surface 31. Bearing 30 includes needles located between running surfaces 39, 31. To facilitate rotation of disc 4 with respect to housing 8, a needle bearing 32 is supported on a bearing surface 33 located on housing part 9 surrounding shaft 1, the bearing being supported at the opposite axial side on a ring 34, which surrounds driving shaft 1 and is pressed into contact with the needles of bearing 32 by a Belleville spring 35.

Spring 35 is supported with its inner periphery contacting an annular flange of ring 34 and its outer periphery contacting the side of driving disc 2 facing housing 9. Contact pressure on ball bearing 15, required for power transmission at abutment points P1 and P2, is developed by the force of spring 35.

Figure 3:
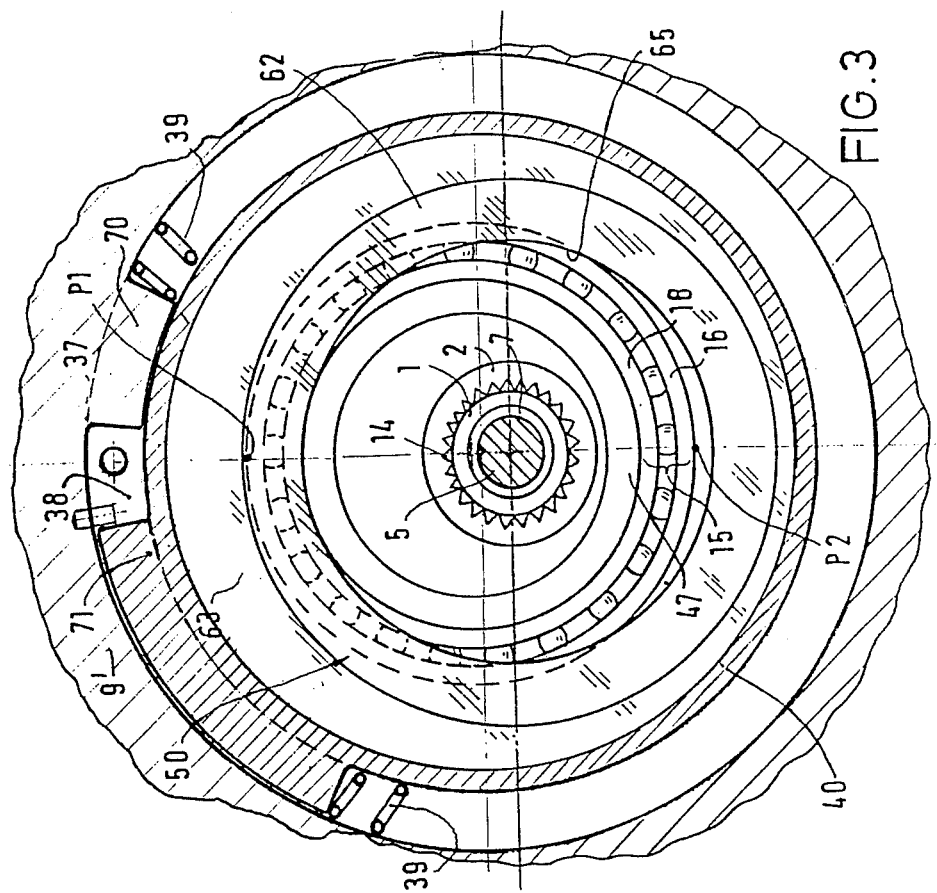
FIG. 3 is a cross section through the gear of FIG. 2 taken at plane III—III.
Figure 2:
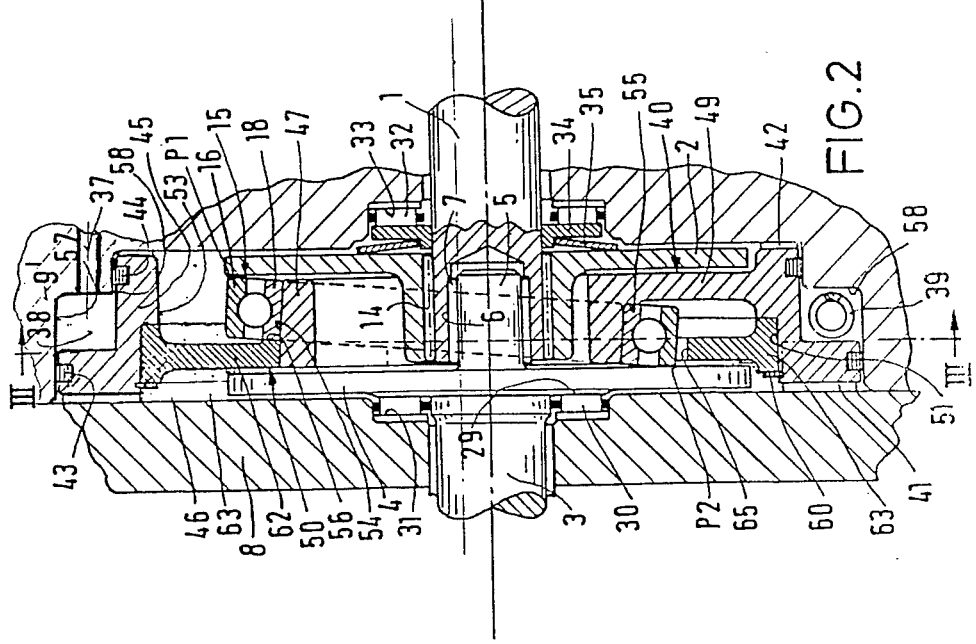
FIG. 2 is a cross section through an hydraulically displaceable annular friction gear.

FIGS. 2 and 3 show a second embodiment, in which a hydraulically actuated displacement device is provided in place of the mechanically actuated displacement device of the embodiment of FIG. 1. Both embodiments are constructed in a similar way, aside from the displacement technique, the same components being referred to with the same reference numerals.

The hydraulically actuated displacement device includes a first annular disc 40, rotatable with the shafts 1 and 2 and defining a space between discs 2 and 4 within which ball bearing 15 is located. Disc 40 is eccentric of shafts 1 and 3, as indicated by the parallel horizontal centerline of FIGS. 2 and 3. Inner race 18 of bearing 15 is supported on inner flange 47 of disc 40, the inner flange 47 being disposed obliquely to the axis of the driving and driven shafts. The outer surface of outer race 16 of bearing 15 forms an angle with respect to the shaft axis, equal to the inclination of the central axis of bearing 15. Disc 40 includes recess 53, through which the obliquely held ball bearing 15 can pass in order to make contact with driving disc 2.

On the side radially opposite recess 53, disc 40 includes a web 49 connecting inner flange 47 to the radially outer portion of the disc. Web 49 extends through the space between driving disc 2 and bearing 15. Web 49 comprises an axial stop surface 55 extending perpendicular to the outer race surface 54. Web 49 connects eccentric inner flange 47 to the outer region of disc 40, which comprises outer flange 45, concentric with the axis of the shafts and a flange 46 provided on the side facing driven disc 4 and projecting radially outward on outer flange 45.

Housing part 9' is connected to housing part 8 and has a first cylindrical inner surface 57, which rests tightly against the outer end face of flange 46, and another cylindrical inner surface 58, offset radially inward from surface 57. The end area of the outer race 45 rests tightly with its outer surface against the cylindrical inner surface 58. To achieve tight contact on the cylindrical inner surfaces 57 and 58, O-ring seals 43, 44 are located in grooves formed in the cylindrical outer surfaces of flange 46 and outer race 45, respectively.

The stage between the cylindrical inner surfaces 57, 58 on housing 9' defines a circular channel 38 having an approximate square cross section. Channel 38 is bounded by surfaces located between the cylindrical inner surface 57, the facing radial outer surface of outer race 45, the stepped surface of housing part 9' extending radially between cylindrical inner surfaces 57, 58, and the axially opposite radially extending surface located between the cylindrical outer surfaces of flange 46 and outer race 45. Pressurized hydraulic fluid is supplied to channel 38 through passage 37. Housing 9' includes projection 70 extending into channel 38 on one side of bore 37, the projection having a cross section and circumferential length forming a barrier to the passage of fluid. On the opposite side of bore 37, a projection 71 on disc 40 extends into channel 38. The cross section and circumferential length of projection 71 are sized so that the projection forms a barrier to the passage of fluid. An annular spring 39 located in channel 38 contacts projection 70 on the side remote from bore 37. The spring contacts projection 71 on its side remote from bore 37. Disc 40 is rotated against the force of the spring against the stop to an end position where ball bearing 15, held in the inner race 47, occupies the position illustrated in FIG. 2. In this position, contact point P1, where outer race 16 contacts driving disc 2, is in the outermost radial position.

If fluid pressure is introduced through bore 37 into channel 38, disc 40 is rotated against the force of annular spring 39. During this rotation, ball bearing 15 is turned so that, because of its eccentric mounting, contact point P1 is moved inward on a spiral path from the aforementioned outermost radial position, and concurrently with this movement, contact point P2 moves outward on a spiral path. The radial distance by which contact point P1 on driving disc 2 is moved inward corresponds exactly to the radial distance by which contact point P2 on driving disc 4 moves outward. Therefore, because of the presence of pressurized fluid in channel 38, a desired change in the transmission ratio of the annular friction gear is achieved.

If pressure in channel 38 is reduced by draining fluid through port 37 so that the force of the annular spring 39 is greater than the fluid pressure developed on disc 40, the disc rotates in the opposite direction against the force of the annular spring so that contact point P1 on driving disc 2 moves outward and contact point P2 on the driven disc 4 moves inward.

Ball bearing 15 is held on the inner flange 47 of disc 40 by an additional second disc 50 carried on disc 40. Disc 50 has a annular web 62 connected to an outer flange 63. Web 62 is located in the space between ball bearing 15 and the driven disc 4. Disc 50 has, on its side facing driving disc 2, an abutment surface 56 extending perpendicular to outer flange surface 54 of inner race 47. On the opposite radial side from abutment surface 56, disc 50 has a recess 65 through which ball bearing 15 passes so that its outer race 16 comes into contact with driven disc 4. Outer race 63 of disc 50 is located in an annular shoulder 51 of disc 40 and is held there resiliently by circlip 60, or a similar device, installed after assembly of the ball bearing 15 on the inner race 60 of disc 40. Circlip 60 prevents axial movement of the disc 50 away from contact with the shoulder 51.

Thrust washers 41 and 42, shown in FIG. 2, permit slight rotation of disc 40 with respect to housing parts 8 and 9', respectively. Thrust washer 41 is located between the mutually facing surfaces of flange 46 and housing part 8. Thrust washer 42 is located between mutually facing surfaces of housing 9' and outer ring 45.

In the two embodiments illustrated, Belleville spring 35 produces the force by which outer race 16 of ball bearing 15 is pressed against the driving disc 2 and the driven disc 4. By a suitable arrangement of the force produced by spring 35, it is possible to ensure that the annular friction gear transmits only the torque required to be transmitted. Therefore, if failure occurs briefly due to seizure, a safeguard against overloading results by permitting a speed difference caused by slippage.

Driven shaft 3 is best made integral with input gear 3 of a gear pump or sickle pump.

In the space between driving disc 2 and driven disc 4, ball bearing 15 can also be inclined in a direction which extends opposite to the inclination illustrated in FIGS. 1 and 2.

In place of conventional ball bearings, which abut contact points P1 and P2, it is possible also to use ball bearings whose outer race is provided with chamfers in order to increase the abutment surface at the contact points.

Having described a preferred embodiment of my invention, what I claim and desire to secure by U.S. Letters Patent is:

1. A friction gear for changing the drive ratio between an input and an output, comprising:
   driving and driven shafts;
   driving and driven discs, each disc connected to the corresponding shaft, the shafts and discs being rotatably mounted coaxially, the discs having faces spaced apart axially;
   a ball bearing radially displaceable between the discs, disposed obliquely between the discs, having an inner race, an outer race contacting the driving disc at a first contact point and contacting the driven disc at a second contact point; and
   displacement means including:
   an inner flange defining a canted surface in which the inner race is supported obliquely with respect to the faces of the driving and driven discs;
   an outer flange located radially outward from the inner race;
   a web extending radially between the inner flange and outer flange, passing through a space located between the ball bearing and the driving disc on the side of the ball bearing radially opposite the first contact point; and
   a recess adjacent the outer race providing clearance that permits contact between the outer race and the first contact point on the driving disc.

2. The friction gear of claim 1 further comprising:
   a source of pressurized fluid;
   a chamber connected to the fluid pressure source, bounded by a surface of the first disc such that a pressure force on said surface urges the first disc to rotate in a first direction; and
   spring means for resiliently urging the first disc to rotate opposite the first direction.

3. The friction gear of claim 2 wherein the inner race contacts an abutment surface on the first discs and an abutment surface on the second disc.

4. The friction gear of claim 1 further comprising:
   a second disc carried by the first disc, located in a space between the ball bearing and the driven disc, and having a recess adjacent the outer race providing clearance that permits contact between the outer race and the second contact point on the driven disc.

5. The friction bear of claim 4 wherein the inner race contacts an abutment surface on the first discs and an abutment surface on the second disc.

6. The friction gear of claim 1 wherein the inner race contacts an abutment surface on the first disc and an abutment surface on the second disc.

7. The friction gear of claim 1 further comprising means for forcing the driving disc and driven disc axially into frictional contact with the ball bearing at the first and second contact points.

* * * * *